(12) United States Patent
Tandon

(10) Patent No.: US 10,992,485 B2
(45) Date of Patent: Apr. 27, 2021

(54) NETWORK DEVICE HAVING INTERFACE CAPABLE OF OPERATING IN INDEPENDENT MODE

(71) Applicant: Devashi Tandon, Delhi (IN)

(72) Inventor: Devashi Tandon, Delhi (IN)

(73) Assignee: Devashi Tandon, Delhi (IN)

( * ) Notice: Subject to any disclaimer, the term of this patent is extended or adjusted under 35 U.S.C. 154(b) by 0 days.

(21) Appl. No.: 16/531,166

(22) Filed: Aug. 5, 2019

(65) Prior Publication Data

US 2020/0374142 A1    Nov. 26, 2020

(30) Foreign Application Priority Data

May 25, 2019  (IN) .............................. 201911020818

(51) Int. Cl.
*H04L 12/12*  (2006.01)
*G06F 11/07*  (2006.01)
*H04L 12/861*  (2013.01)

(52) U.S. Cl.
CPC .......... *H04L 12/12* (2013.01); *G06F 11/0748* (2013.01); *G06F 11/0793* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 2004/0128373 A1* | 7/2004 | Schuster | H04L 69/329 709/223 |
| 2009/0003319 A1* | 1/2009 | Sood | H04L 12/66 370/352 |
| 2010/0262691 A1* | 10/2010 | Shouno | H04L 69/28 709/224 |
| 2020/0374221 A1 | 11/2020 | Tandon | |

* cited by examiner

*Primary Examiner* — Kouroush Mohebbi

(57) ABSTRACT

The present disclosure relates to a Network Interface Card (NIC) that is operatively coupled with a network device and comprises at least one network interface/port, wherein the NIC further comprises a processing unit; a non-volatile memory operatively coupled with the processing unit; and a power input connected to a decoupled power supply, wherein the NIC is configured in a manner that allows the NIC to work in an independent mode by decoupling from the main processor of the network device such that the NIC performs one or more programmed operations even when the network device is non-operational or when the network device undergoes a network change event.

15 Claims, 10 Drawing Sheets

NETWORK DEVICE HAVING INTERFACE CAPABLE OF OPERATING IN INDEPENDENT MODE

CROSS-REFERENCE TO RELATED APPLICATIONS

The present application is related to application Ser. No. 16/531,158 filed on the same date as the present application by inventor Devashi Tandon, and incorporated by reference.

FIELD OF DISCLOSURE

The present disclosure relates in general to networking. In particular, the present disclosure relates to a network device that provides for efficient networking under all situations. Further particularly, the present disclosure relates to a network device having network ports/interfaces that are capable of operating in independent mode i.e. the ports being self-responsive.

BACKGROUND OF THE DISCLOSURE

The background description includes information that may be useful in understanding the present invention. It is not an admission that any of the information provided herein is prior art or relevant to the presently claimed invention, or that any publication specifically or implicitly referenced is prior art.

Network Interfaces used for sending/receiving data over underlying network have evolved over a period of time. Evolution of Network Interface Cards (NICs) has been more towards data transfer rate they support, with the ever-growing needs of the network devices, and users. High End network devices such as routers and switches use custom technologies to optimize and support maximum data transfer rates. However, interfaces are still tightly or loosely coupled with the central system of the network device or with the host device that they are a part of. Sometimes, the device and the network can benefit when interfaces are still operational, when the main device is not. However, existing solutions do not enable this.

Current hardware technologies for network interfaces can be broadly classified into two categories: NICs for end-host devices or other low-end network devices, and NICs for High-End Network Devices requiring high speed switching and routing. None of these technologies are currently completely decoupled or offer a mode in which they could operate completely decoupled from the main system.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

Some of the objects of the present disclosure, which at least one embodiment herein satisfies are as listed herein below.

It is an object of the present disclosure to provide for a network device that has an interface that can even operate when the main/network device is not operational.

It is an object of the present disclosure to provide for a network interface that can even operate when the main/network device is not operational.

SUMMARY

The present disclosure relates in general to networking. In particular, the present disclosure relates to a network device that provides for efficient networking under all situations. Further particularly, the present disclosure relates to a network device having network ports/interfaces that are capable of operating in independent mode i.e. the ports being self-responsive.

In an aspect, the present disclosure relates to a Network Interface Card (NIC) operatively coupled with a network device and comprising at least one network interface/port, the NIC comprising: a processing unit; a non-volatile memory operatively coupled with the processing unit; and a power input connected to a decoupled power supply, wherein the NIC is configured in a manner that allows the NIC to work in an independent mode by decoupling from the main processor of the network device such that the NIC performs one or more programmed operations even when the network device is non-operational or when the network device undergoes a network change event.

In an aspect, the NIC can include one or more network interfaces that operate in transparent mode without requiring change in network interfaces of other network devices.

In another aspect, during operation of the NIC in the independent mode, the one or more programmed operations can be selected from any or a combination of reporting errors when the network device is non-functional, performing minimum programmed operations even when the network device is non-functional, sending status updates of the network device periodically or in real-time, handling communication with external network devices during software upgrade, detecting software/hardware/firmware failures in the network device, sending programmed messages, performing operations that are programmed to be offloaded from the network device to the NIC, and replying to one or more configured requests from other network devices.

In another aspect, the network device can be any or a combination of a client device, a router, a switch, a hub, a controller, a network security device, a server, and a computing device having networking capabilities.

In another aspect, the network change event can include, but is not limited to, any or a combination of software change in the network device, crash of the network device, network device reboot or boot up, network device shutdown, software debug, power outage/power outage resolution, power failure, and a failure in which the network device becomes non-functional and is unable to directly communicate over its network ports.

In another aspect, the decoupled power supply can be any or a combination of a battery, a secondary power supply, and Power over Ethernet (PoE) based powering.

The proposed NIC can further include any or a combination of a Random Access Memory (RAM), an I/O interface for communication with the network device, one or more Mode Pins, and a Mode Register, wherein the Mode Register is configured to enable/disable the independent mode based on value of the Register.

In another aspect, the NIC and components thereof can be implemented as an SoC, wherein the one or more Mode Pins can include a CHG_MODE Pin that is configured as an Input Pin to enable change in Mode of the NIC from Normal to Independent or from Independent to Normal, and a CHK_MODE pin that is configured as an Output Pin to indicate current mode of the NIC. In an aspect, when the network change event occurs, CHG_MODE Pin can be configured to control the behavior of the NIC through operation of the one or more programmed operations, along with enabling the Mode Register so as to activate the Independent Mode.

In an aspect, the NIC can further include a RESET Pin to allow a user to reset the NIC to default settings.

In another aspect, the proposed network device can be configured to form part of a network having a plurality of other network devices, wherein network or a part thereof is operatively coupled to a central routing server (CRS) through an out-of-band (OOB) network, and wherein the network device can be connected with the CRS through the at least one network interface/port. In an aspect, the NIC and its at least one network interface/port can send messages to and receive messages from the CRS without interacting with the main processor of the network device.

In an aspect, the proposed network device can be capable of relaying an identification (ID) of a mobile device to the nearest cell tower, indicating to a cell tower the location of a mobile device even when the mobile device (network device in this instance) is switched off.

The present disclosure further relates to a network device comprising a Network Interface Card (NIC) having at least one network interface/port, the NIC comprising: a processing unit; a non-volatile memory operatively coupled with the processing unit; and a power input connected to a decoupled power supply, wherein the NIC is configured in a manner that allows the NIC to work in an independent mode by decoupling from the main processor of the network device such that the NIC performs one or more programmed operations even when the network device is non-operational or when the network device undergoes a network change event.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
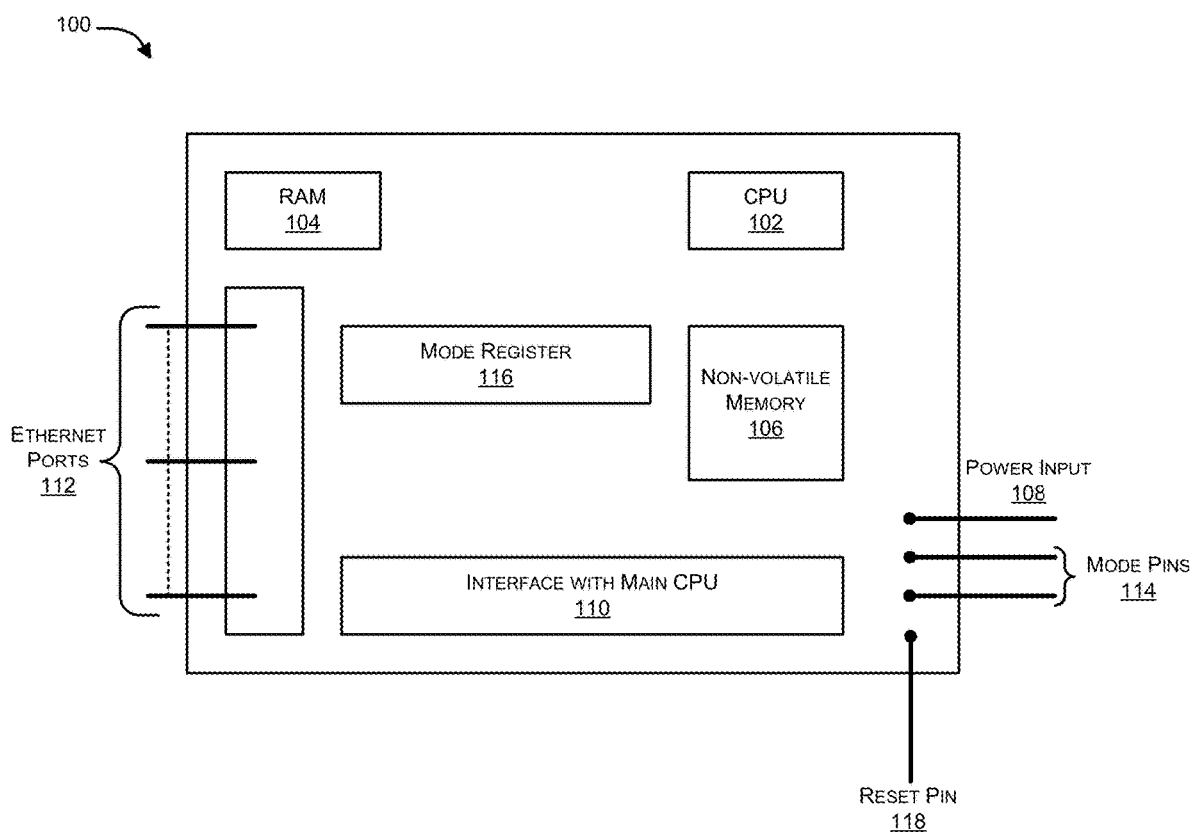
FIG. 1 is an exemplary illustration of components of a Network Interface Card (NIC) that enable it to support Self-Responsive Interfaces/Ports.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Device depicted in figure enclosed may be provided in various configurations. In some embodiments, the device may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The present disclosure relates in general to networking. In particular, the present disclosure relates to a network device that provides for efficient networking under all situations. Further particularly, the present disclosure relates to a network device having network ports/interfaces that are capable of operating in independent mode i.e. the ports being self-responsive.

In an aspect, the present disclosure relates to a Network Interface Card (NIC) operatively coupled with a network device and comprising at least one network interface/port, the NIC comprising: a processing unit; a non-volatile memory operatively coupled with the processing unit; and a power input connected to a decoupled power supply, wherein the NIC is configured in a manner that allows the NIC to work in an independent mode by decoupling from the main processor of the network device such that the NIC performs one or more programmed operations even when the network device is non-operational or when the network device undergoes a network change event.

In an aspect, the NIC can include one or more network interfaces that operate in transparent mode without requiring change in network interfaces of other network devices.

In another aspect, during operation of the NIC in the independent mode, the one or more programmed operations can be selected from any or a combination of reporting errors when the network device is non-functional, performing minimum programmed operations even when the network device is non-functional, sending status updates of the network device periodically or in real-time, handling communication with external network devices during software upgrade, detecting software/hardware/firmware failures in the network device, sending programmed messages, performing operations that are programmed to be offloaded from the network device to the NIC, and replying to one or more configured requests from other network devices.

In another aspect, the network device can be any or a combination of a client device, a router, a switch, a hub, a controller, a network security device, a server, and a computing device having networking capabilities.

In another aspect, the network change event can include, but is not limited to, any or a combination of software change in the network device, crash of the network device, network device reboot or boot up, network device shutdown, software debug, power outage/power outage resolution, power failure, and a failure in which the network device becomes non-functional and is unable to directly communicate over its network ports.

In another aspect, the decoupled power supply can be any or a combination of a battery, a secondary power supply, and Power over Ethernet (PoE) based powering.

The proposed NIC can further include any or a combination of a Random Access Memory (RAM), an I/O interface for communication with the network device, one or more Mode Pins, and a Mode Register, wherein the Mode Register is configured to enable/disable the independent mode based on value of the Register.

In another aspect, the NIC and components thereof can be implemented as an SoC, wherein the one or more Mode Pins can include a CHG_MODE Pin that is configured as an Input Pin to enable change in Mode of the NIC from Normal to Independent or from Independent to Normal, and a CHK_MODE pin that is configured as an Output Pin to indicate current mode of the NIC. In an aspect, when the network change event occurs, CHG_MODE Pin can be configured to control the behavior of the NIC through operation of the one or more programmed operations, along with enabling the Mode Register so as to activate the Independent Mode.

In an aspect, the NIC can further include a RESET Pin to allow a user to reset the NIC to default settings.

In another aspect, the proposed network device can be configured to form part of a network having a plurality of other network devices, wherein network or a part thereof is operatively coupled to a central routing server (CRS) through an out-of-band (OOB) network, and wherein the network device can be connected with the CRS through the at least one network interface/port. In an aspect, the NIC and its at least one network interface/port can send messages to and receive messages from the CRS without interacting with the main processor of the network device.

In an aspect, the proposed network device can be capable of relaying an identification (ID) of a mobile device to the nearest cell tower, indicating to a cell tower the location of a mobile device even when the mobile device (network device in this instance) is switched off.

The present disclosure further relates to a network device comprising a Network Interface Card (NIC) having at least one network interface/port, the NIC comprising: a processing unit; a non-volatile memory operatively coupled with the processing unit; and a power input connected to a decoupled power supply, wherein the NIC is configured in a manner that allows the NIC to work in an independent mode by decoupling from the main processor of the network device such that the NIC performs one or more programmed operations even when the network device is non-operational or when the network device undergoes a network change event.

In an aspect, the present disclosure pertains to a network interface and NIC that are configured in a network device in a manner that they are able to operate even without the network/main device being operational. In other words, the proposed network interfaces (also interchangeably referred to as ports hereinafter) can be configured such that they are capable of operating in a decoupled mode without any communication with the processor of the main device (also interchangeably referred to as network device hereinafter).

It would be appreciated that although it is possible that the proposed network interfaces/ports are not fully functional/operational without the associated network/main device being operational, but they are able to support minimum required functionality in such a mode of operation. In an aspect, the functionality supported in such a mode can be programmable, and may differ from device to device based on the requirements of the device or the network that the interfaces are deployed on. Therefore, what functionality each network interface offers to its corresponding network device can be configured by an administrator for the respective network device or type thereof, such as for router or switches or network controllers or hubs or any other type of network device.

In an aspect, network interfaces can be configured such that their operation, in the independent mode, is transparent to the network, i.e. the network/host devices or the interfaces elsewhere in the network are not required to change their own behavior/operation when some of the network interfaces on one or more devices change to this independent mode. In other words, the proposed network interfaces operating in the independent mode are able to co-exist with interfaces operating in normal mode on the network, and are not required to have the knowledge of the mode of other interfaces that exist in the network.

In an aspect, the proposed interface can be decoupled from the main CPU of the network device that the interface forms part of. The proposed network interface can further be capable of reporting errors even in cases when the main device is non-functional, along with being capable of performing minimum programmed operations even in cases when the main device is non-functional. In an aspect, the proposed network interface can be used for detecting failures even in applications that do not necessarily rely on routing techniques, and it would respond faster than detecting failures in software.

The present disclosure further provides for a specialized NIC firmware that can significantly reduce the time of sending messages especially in case of hardware failures.

In an aspect, the proposed network interface can enable communication with other/external network devices when the main device is down or non-operational, or when the network device (in which the instant network interface has been positioned/configured) has crashed, or when a software change occurs, or during device reboot/boot up, device shutdown, power outage/power outage resolution, power failure, or any other failures in which the device is/becomes non-functional and unable to directly communicate over its network ports. The proposed network interface also enables communication with one or more external devices when the software is being upgraded on a live/network device in which the interface/port is configured. Usually when live devices (that are running on the network) are upgraded, there may be a period of inactivity, where the main device may not be available, in which scenario and during which periods, independent mode of the proposed network interface can be used to continue communication.

In another aspect, the proposed network interface can be used for sending Status Messages, which can be done even when main device is operational, for instance, for purpose of reducing load on main CPU. In yet another aspect, the proposed network interface can enable real-time and efficient responses to be sent to Requests/Messages that require response from the network device, but do not require the main system to be aware of them. This may be done to optimize certain protocols like Internet Control Message Protocol (ICMP) (ping requests, for example) or Address Resolution Protocol (ARP).

In an exemplary implementation, the proposed network interface also enables interaction with the main system/network device only when required, wherein requests such as, for instance, ping, ICMP, ARP, error messages, Health checks or others can be handled at the proposed network interfaces' end itself, and the main system does not need to bother about handling such requests.

In another aspect, the proposed network interface can operate independently even when the network device that it forms part of is being debugged.

As mentioned above, the proposed network interface supports specific functions when the main/network device is non-operational, where functions can include, but are not limited to in any manner, relaying an identification (ID) of a mobile device to the nearest cell tower, indicating to a cell tower the location of a mobile device even when the mobile device (network device in this instance) is switched off.

In another aspect, the proposed network interface can be used in distributed systems to detect failures between devices, and can be programmed/configured to send messages during failures. The proposed interface can also be used to send messages even in case of some hardware faults. In certain cases, a change to a particular state, may indicate a possible future failure, which has not yet happened, but is likely to happen. Since the interface can send messages related to the occurrence of the state when the state change happened, the other devices could take action before the actual failure. This provides the possibility of supporting pre-emptive action for network failures.

As mentioned above, the proposed network interface helps in fast detection of node failures in a server cluster, prompting immediate corrective action, eliminating the need for relying on health check messages and probes, which are similar to a polling mechanism. The proposed interface is further capable of supporting error detections which are similar to interrupt-based mechanism.

In an aspect, in a computer architecture or in systems software programming, polling mechanism refers to monitoring a resource continuously to take desired action when its state changes. This monitoring is usually done by checking the state at every t time interval, where t may vary based on implementation. Similarly, interrupt-based mechanism refers to taking desired action when the state of a resource changes, but without monitoring it continuously. This is achieved with interrupts, where the system triggers an interrupt when the resource state changes, leading to invocation of the callback function registered as an interrupt handler for that interrupt. This prevents the need for polling and has certain advantages. Polling requires continuous CPU instructions to be executed, and response time is dependent on the value of t. Interrupt based mechanism doesn't require continuous instruction execution and response time is almost immediate.

In computer networking, the resource to be monitored is usually not on the device itself but on another device on the network, and thus a remote resource. Remote resource could simply be the remote network device. To monitor remote resources, health monitoring is used, which involves sending regular health probes after every t time interval to the remote device, which would respond to those probes when the resource is operational. When the resource is unavailable, there may not be any responses, and usually 'n' such probes going without responses would lead the device to interpret that the remote resource is unavailable. Both n and t are configurable based on the implementation/protocol. Health monitoring may also be integrated as part of another protocol, like a routing protocol, and carried out as part of that protocol running on the network devices on the network. The response time for failure is dependent on the values of n and t. This health monitoring can be equated with the polling mechanism explained above.

The present disclosure pertains to monitoring a remote resource on a network, using method similar to interrupt-based mechanisms. Without the suggested invention i.e. without the proposed network interface construction and its operation in independent mode, such mechanism is not possible in computer networks, since the device monitoring the remote resource would not get to know when the remote resource became unavailable, till it tries to use the resource. This has implications in computer networks, since network convergence becomes slow. As part of the present invention, the proposed network interface/port on the remote device can send events when the state of the resource changes, as and when it changes. It can also send events even when the main device fails. This provides an opportunity to have an event-driven response, when the state changes (similar to interrupts), without the need for sending regular health probes for health monitoring. The response time is also significantly reduced as it is no longer dependent on frequency of probe messages and number of unresponsive messages.

Figure 2:
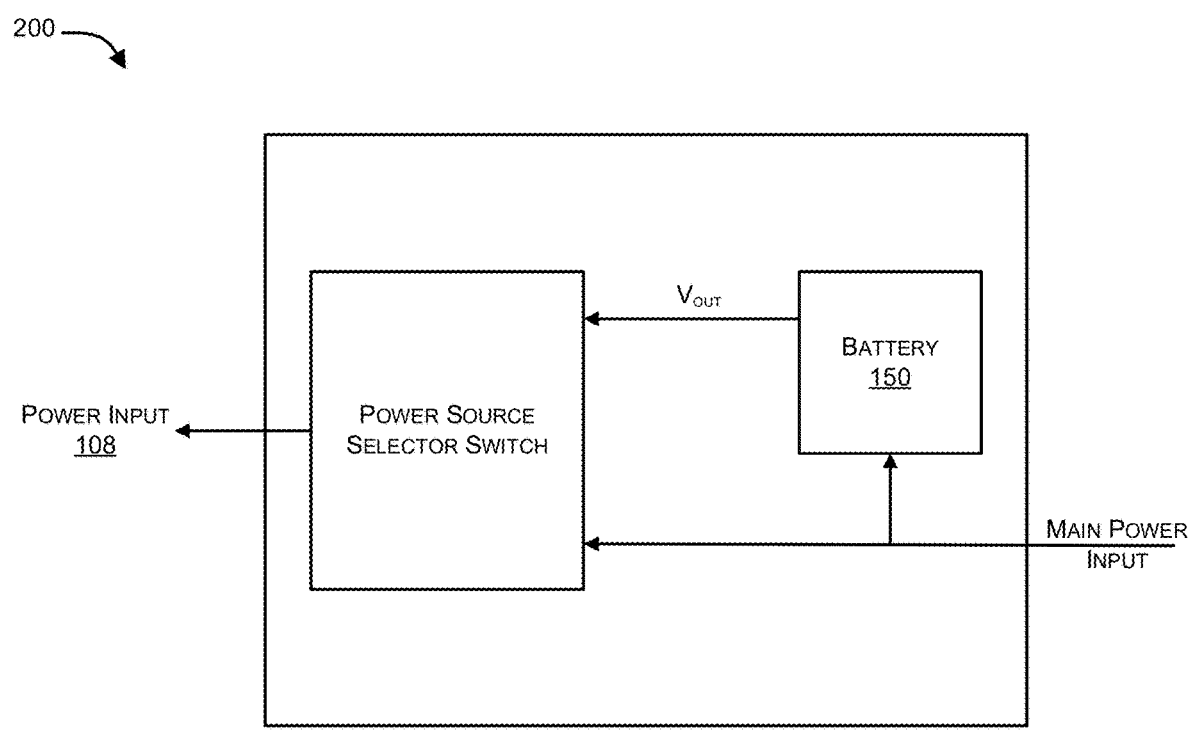
FIG. 2 is an exemplary illustration of power input to the NIC that may consist of one or more alternate power sources besides the main device source in accordance with an embodiment of the present disclosure.
Figure 3A:
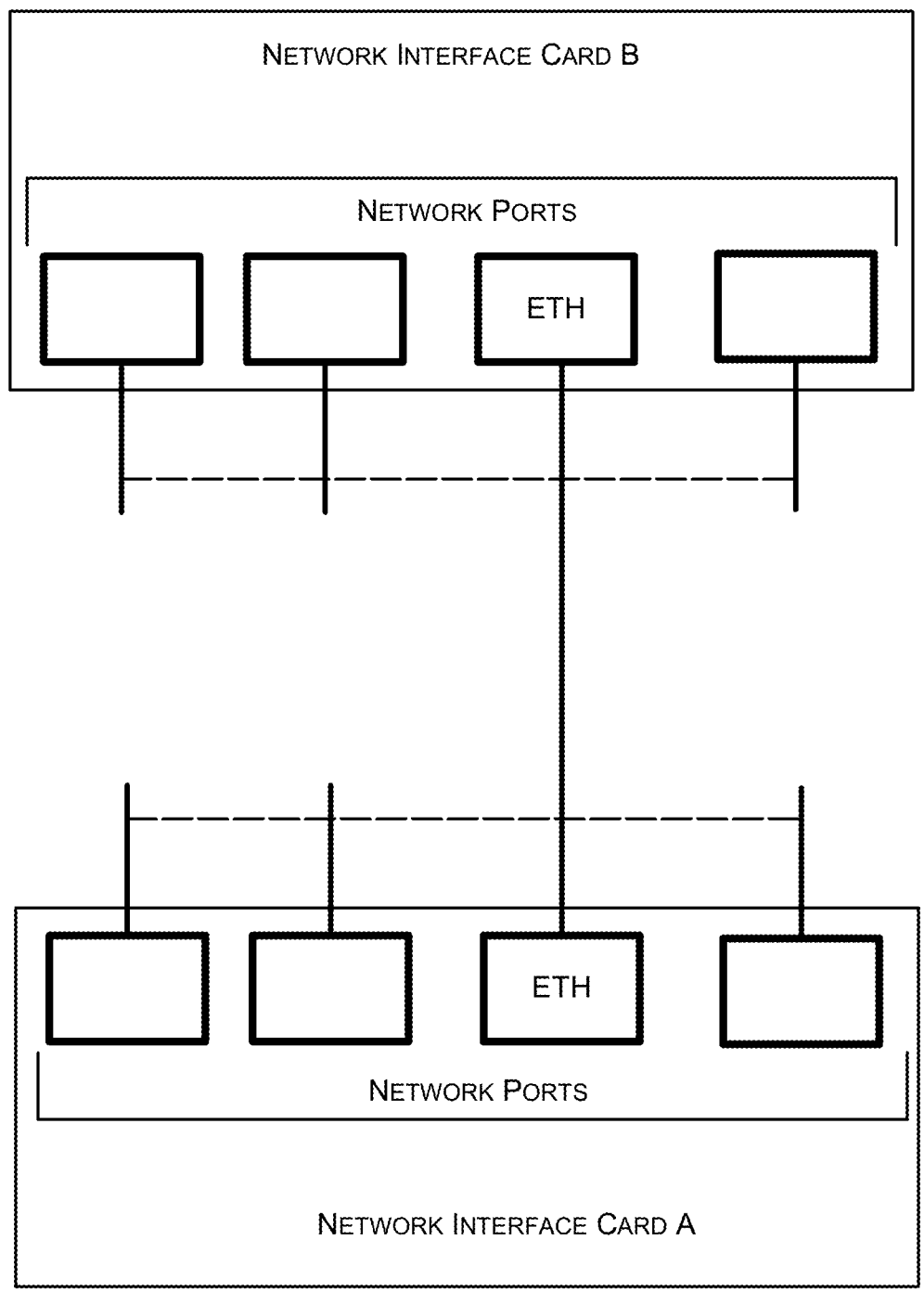
FIG. 3A-3D is an exemplary illustration of the different combinations of the connection of Self-Responsive Ports, operating in different modes in accordance with an embodiment of the present disclosure.
Figure 3B:
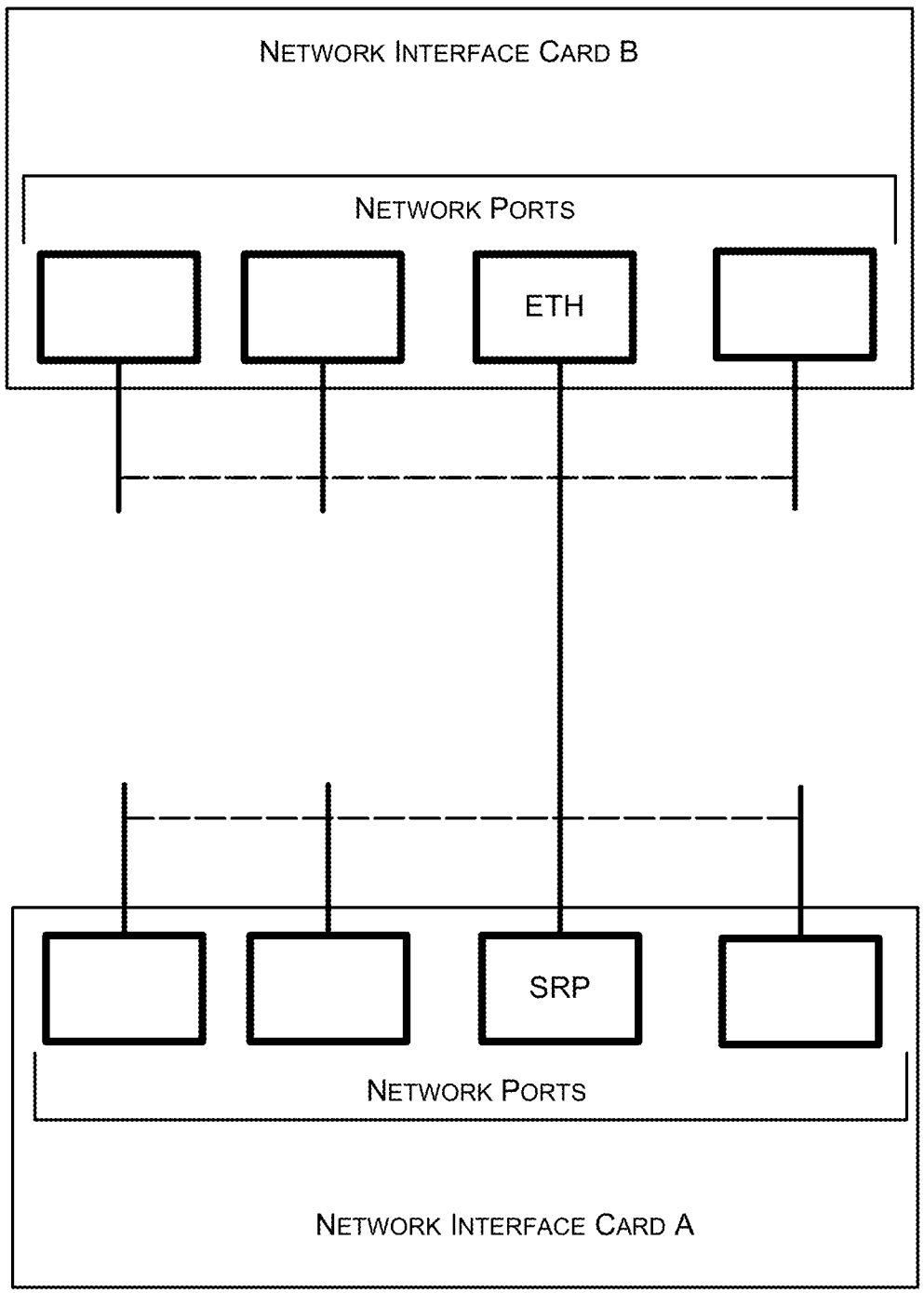
Figure 3C:
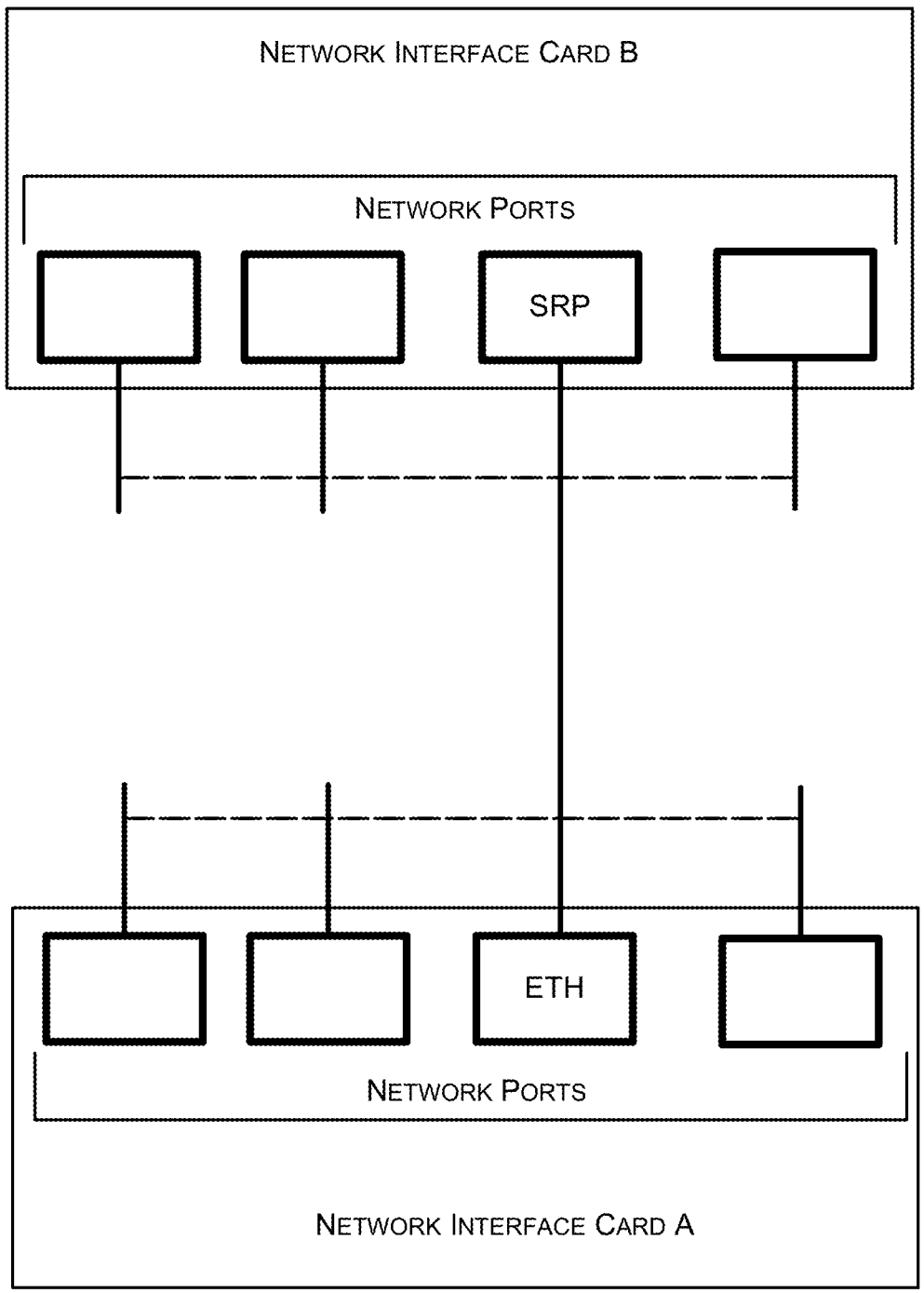
Figure 3D:
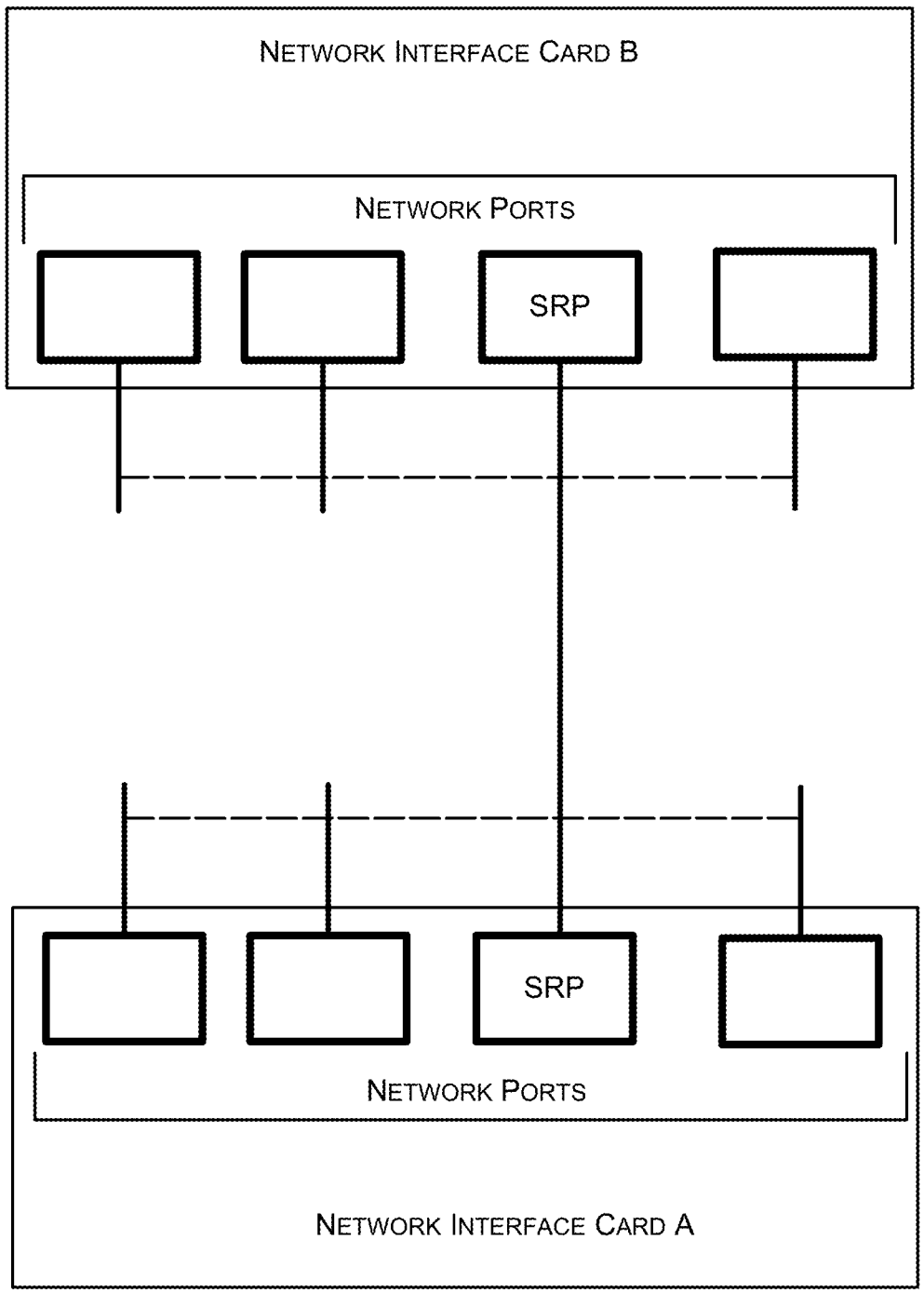

In an aspect, with reference to FIGS. 1 and 2 that illustrate the proposed network interface card (NIC) 100 architecture, the NIC 100 can include, but is not limited to, a low power CPU (Micro-processor) 102, a RAM (Random Access Memory) 104, a Non-Volatile (NV) Memory 106 (such as Flash Memory, for instance), a power input 108, a Decoupled Power Supply (such as, for instance Battery powered 150, or PoE powered, or another power source), an I/O Interface 110 for communication with main device, an Ethernet Controller (not shown), one or more Ethernet Ports 112, one or more Mode Pins (Mode of the Interface can be changed through these Pins) 114, a Mode Register 116 to enable/disable independent mode, persistent across reboots, and optionally a RESET Pin 118.

As can be appreciated, NIC is configured to functionally provide hardware that can operate one or more network interfaces. A NIC may control one or more than one interfaces/ports. The NIC may be a separate physical hardware card that connects to the main computer as a peripheral device, or fitting into a dedicated slot in a specialized hardware, or may be integrated into the motherboard for the main computer or may be integrated as one component in circuit boards of other hardware systems that are part of the main computer. More than one NICs could form part of the main computer.

In an aspect, main device as regards the present disclosure is concerned can be the main computer system (embodied in the form of any network device, for instance), that is hosting the NIC 100. NIC can therefore be considered part of the main device or can be operatively coupled thereto, wherein the interfaces of the NIC (such as the proposed 100) can be used by the main device for communication over one or more networks.

It would be appreciated that main device is being generalized in the instant disclosure and is to be treated as a single computer system. An actual main device may have a more complex architecture consisting of multiple segregated systems interacting with each-other and collectively working as a single system. In such cases, the main device may have internal connections and division of software modules. The main device may have a Control-plane, Data-plane segregation where both planes run on separate CPUs/separate boards/separate computers. However, since the hardware, even with its complexity, provides an abstraction of working as a single system, it is referred to as a main device, irrespective of the underlying hardware. For the purpose of the NIC (which may be just one sub-system of the main device), the rest of the hardware of the system can be the main device. The instant disclosure therefore relies on an abstraction of a single computer system for the main device that is transparent to the internal hardware complexity.

SoC or a System-on-Chip is an Integrated Circuit that integrates all components of a computer system on a single chip. In an exemplary embodiment, CPU 102/RAM 104/Memory 106 required on the NIC 100 and any I/O Ports required for communication with the main device can be implemented as an SoC, since SoCs are optimized for power, space, and performance. Further, some or all of the other components on the NIC may be integrated as part of the SoC. In case where all the components of the proposed NIC 100 are implemented in a SoC, the SoC and NIC can be interpreted as being equivalent.

It would be appreciated that although recommended as an SoC, the actual hardware may still not be implemented entirely on a single chip and may be implemented as multiple components that are part of the NIC 100. If a particular implementation of a NIC is already using a SoC based hardware (high speed interfaces usually use specialized SoCs to speed up network throughput and performance of network ports/interfaces), the proposed SoC and its features could be integrated as part of the existing solution and the hardware may be modified to achieve the desired functionality.

In an exemplary aspect, for the sake of simplicity, a NIC card with one Interface/Port may be considered for easier comprehension of the proposed structure, wherein if a NIC card contains multiple ports, the design can be extrapolated either to one where all ports on the NIC are coupled to the same behavior, or one where each port of the NIC can have behavior independent of other ports on the NIC, or a combination of both.

In an aspect, the optional RESET Pin 118 can allow a user to reset the NIC to default settings or factory configuration.

In another aspect, value in the Mode Register 116 can be kept persistent across reboots of the NIC 100, wherein any suitable technique can be used to achieve this. For example, a MOV instruction could be defined in the boot sequence to load the suitable value. In another example, the Mode Register 116 could be just a status flag in a status or a flag register, or could be a separate status/flag or hardware register, with an option to expand the number of modes in future. The design of Mode Register is not limiting, and the Mode Register could be based on any suitable hardware design which works best for the NIC.

In an exemplary implementation, a hardware manufacturer can be allowed to decide on which mode to preconfigure when selling the product. If the default mode is Normal, the Register 116 would have the Normal Mode Byte Code written on it, and it would get re-written in case the NIC was RESET.

In another exemplary implementation, although the proposed system can work with a single Mode Pin 114 (CHG_MODE), more than one Pin 114 (say 2 Pins) can be configured, wherein a first Pin 114_1 can be the CHG_MODE pin, and the other Pin 114_2 can be the CHK_MODE pin. The CHG_MODE pin 114_1 can be an Input Pin, or a write only pin, which can be used to set or change the Mode of the NIC. The CHK_MODE pin 114_2, on the other hand, can be configured as the Output Pin or read-only pin, which can be used to indicate the current operational mode of the NIC 100. If dedicated pins are not available on the CPU used in the NIC, GPIO pins can be used as Mode Pins.

In an aspect, when the Mode Register 116 holds the disable value, Independent Mode can be completely disabled on the NIC, and therefore interface/ports associated with the NIC would operate under normal mode and would have the same behavior as any other interface/ports. Also, the CHG_MODE Pin 114_1 would be disabled in this case. On the other hand, when the Mode Register 116 holds an enable value, the Independent Mode would be enabled, in which case, the NIC can operate in Independent Mode, and CHG_MODE Pin 114_1 can be configured to control the behavior. In an aspect, the pull of the CHG_MODE Pin can be controlled via hardware external to the NIC, using appropriate hardware circuit connecting to the CHG_MODE Pin. The NIC would control the pull of the CHK_MODE Pin. It could be read by appropriate hardware circuit, or main CPU to know the current operational mode.

In an aspect, assuming HIGH pull is used for normal mode, if CHK_MODE pin 114_2 is LOW, NIC 100 will be operating in independent mode, and if it is HIGH, it will be operating in Normal Mode. Similarly, assuming HIGH pull is used for normal mode, if the CHG_MODE 114_1 pin is set to LOW, the NIC 100 will be configured to change its mode to Independent Mode (unless it is already in that mode). If the CHG_MODE pin 114_1 is set to HIGH, the NIC 100 will be configured to change the mode to normal mode (unless it is already in that mode).

As would be appreciated, it is not necessary to represent a particular mode with the same pull in both CHK_MODE and CHG_MODE pins. Different pulls could be used for the two pins. However, for consistency, it would be preferable to use the same pull. Also, it is preferable to use HIGH pull for normal mode, since when the main device goes down or loses power, the pull is expected to go LOW and remain LOW till the main device comes up. The requirement here would be to operate in Independent Mode, till the main device resumes operation (pull changes to HIGH).

The hardware and firmware on the NIC 100 can be designed to cause an interrupt when the CHG_MODE pin changes state. The interrupt handler registered for the CHG_MODE pin can be invoked to change the state. When the CHG_MODE pin changes state, the micro-processor can trigger the NIC to change its mode and operate in the new mode. It would gracefully change the mode and change the state of the CHK_MODE pin to indicate the new mode.

For the NIC to work in Independent Mode, when the main system is not operational (either due to crash or reboot or power loss), it would need an alternate power source. By designing the hardware of the NIC to be a low power device, it could work with a much smaller power supply than what is required by the main system. A low-cost rechargeable battery could be integrated/built-in with the NIC or connected via an external connection. In case of Ethernet, PoE or Power over Ethernet could be used to provide supply, from the other end of the network link. In case of NICs with multiple ports, an appropriate circuit could be used to integrate the power received through PoE from any or all of the operational ports on the NIC. Or another secondary power supply could be used to power the NIC in the absence of main power supply, to allow it to operate in Independent Mode. Also, since the NIC wouldn't be running at full-capacity during Independent Mode, Independent Mode could be designed to work as a low power mode.

When switching modes, the hardware can be designed so that the switch is a graceful one. This means the switch may not happen immediately after the Mode Pin changes state. In an exemplary implementation, the NIC can be configured to decide when it can switch-over, depending on any current processing or pending data transfer. For this purpose, CHK_MODE Pin can be used to indicate to the main system when it has switched over.

In an aspect, circuit of the proposed NIC (having one or more proposed network interfaces) can be accompanied by a driver that can be loaded as a piece of software device driver for the circuit in the operating system of the main device, or can be integrated into the OS. In an implementation, the driver can run on the main device processor, and can provide an abstraction to the OS over the NIC hardware/firmware. This device driver can be rendered equivalent to a network driver, but can provide support for the two modes, and any other features on the proposed NIC 100.

In an aspect, one or more programs stored on the NV RAM 106 can be collectively referred to as its firmware, wherein the firmware can include programs written for the NIC to function as desired in independent mode and normal mode. The firmware may further include programs to implement parts of certain protocols/features that do not require interaction with main device. It would be appreciated that a hardware manufacturer can decide to load a fixed non-modifiable firmware or may provide a means to load and upgrade the firmware.

When a firmware is modifiable, network device or host device manufacturers can put in their custom functionality on the proposed NIC, which they could upgrade when required. In an aspect, the proposed NIC can have a programmable memory for this purpose, wherein the firmware can run on the CPU of the NIC. As would be appreciated, behavior of programs in Normal Mode may differ when Independent mode is enabled via the Mode register 116 v/s when Independent Mode is disabled via the Mode register 116.

FIG. 3A-3D is an exemplary illustration of different combinations of connections of Self-Responsive Ports (SRPs), capable of operating in Independent/Normal Modes. FIG. 3(*a*) illustrates a regular ETH-ETH Port Connection which is not affected by any changes in Self Responsive Ports existing on the network. FIG. 3(*b*) illustrates an example of an SRP Port connecting to an ETH Port. When the Independent Mode is disabled in the Mode Register 116, the SRP Port operates as a regular ETH Port, and the operation of the connection would be the same as in FIG. 3(*a*). When the Independent Mode is enabled in the Mode Register 116, the SRP Port is capable of working in both Independent Mode and Normal Mode. In this case, the ETH Port on the other end may or may not be aware of the Mode of SRP Port, which depends on the SRP implementation. When configured in Independent Mode, the SRP Port works with all the functions of the Self-Responsive Port supported by the particular hardware design of the SRP Port. The other combinations of Port Connections are SRP-ETH (FIG. 3c) which is similar to FIG. 3b except that the NIC cards are inter-changed, and SRP-SRP (FIG. 3d) in which both the ports are SRP Ports. In an SRP-SRP connection, it is not necessary that both ports must be operating in the same mode. They could exist in any of the supported modes, independent of the mode of the SRP Port at the other end.

Figure 4:
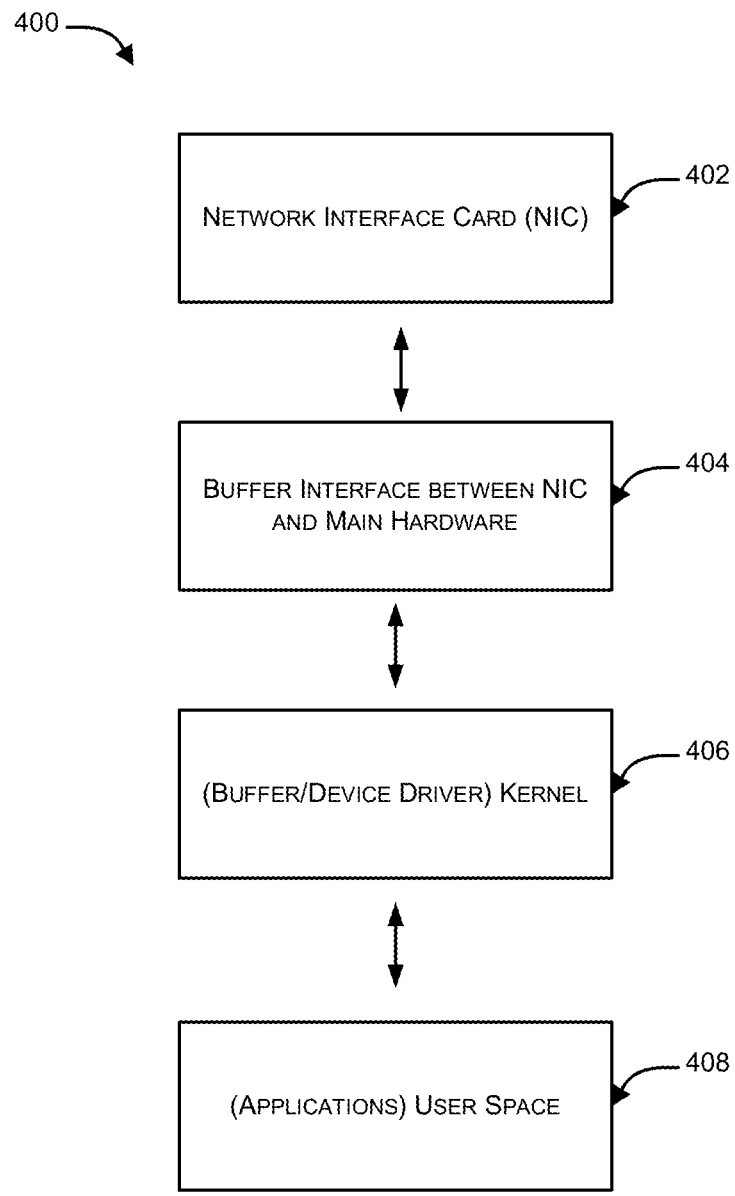
FIG. 4 is an exemplary illustration of how device driver on main network device can exchange data between the NIC and the main device OS, providing an abstraction for other applications in accordance with an embodiment of the present disclosure.

FIG. 4 is an exemplary illustration of how device driver on main network device can exchange data between the NIC and the main device OS, providing an abstraction for other applications in accordance with an embodiment of the present disclosure. As can be seen, the NIC 402 can communicate with the network device through a buffer interface 404 that is configured between the NIC and the main hardware (network device), wherein the interface 404 can be operatively coupled with a buffer/device driver kernel 406, which enables applications installed in the main device OS to communicate with the applications in user space.

Figure 5:
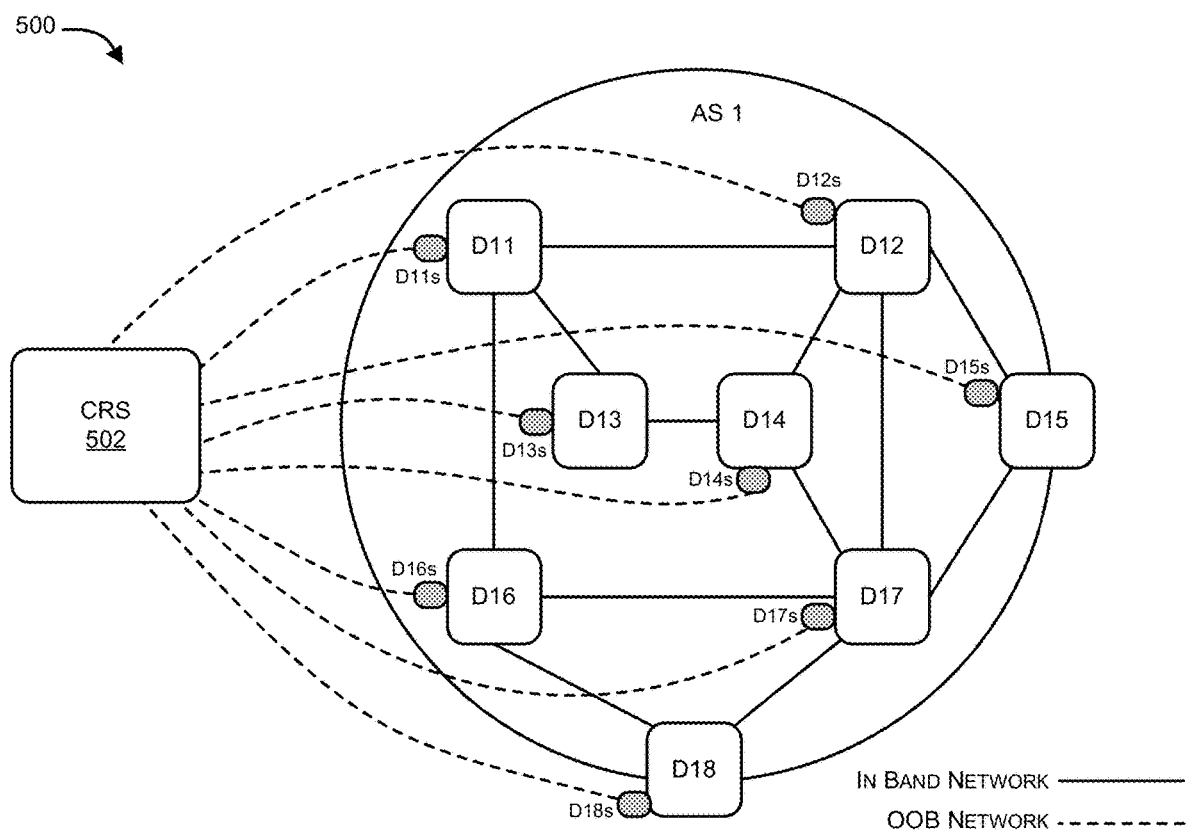
FIG. 5 is an exemplary illustration of a network device using an Out-of-Band Self-Responsive Port as a CRS Port to communicate with the CRS in a CRS based network in accordance with an embodiment of the present disclosure.

FIG. 5 is an exemplary illustration of a network device using an Out-of-Band Self-Responsive Port (SRP) as a CRS Port to communicate with the CRS in a CRS based network in accordance with an embodiment of the present disclosure. In an aspect, programmable firmware can allow the NIC to be programmed/configured differently for different deployments. For example, when used for one or more ports of a Central Routing Server (CRS) 502, the NIC of at least one network device (such as D11, D12, . . . , and D18) of an autonomous system (AS 1) may support sending messages to the CRS 502 and receiving messages from it through a SRP Port (such as D11s, D12s, . . . , and D18s). When used in in-line ports, it may be programmed to respond to certain messages like PING and ARP requests or even send/receive routing protocol probe messages, without interacting with the main CPU for this purpose. Therefore, based on the requirement, the firmware could be written differently.

In an aspect, the proposed network device can be capable of relaying an ID (identification) of a mobile device to the nearest cell tower, indicating to a cell tower the location of a mobile device even when the mobile device (network device in this instance) is switched off.

In order to implement certain light-weight protocols entirely on the NIC, one or more modules can be written within the firmware that may carry out essential networking functions, which essentially implement the protocol layer, in part or in full.

In an example, assuming that a protocol requires that every message sent by a device should get an acknowledgement from the receiving device, and in the absence of receipt, requires the sender to retransmit the packets. If the senders state has changed, since the last message was sent, and acknowledgement is still awaited, it could send the message with the current status, not waiting for acknowledgement of previous message. Such a protocol could be implemented in the firmware, so that the interface/port can execute the protocol layer even in Independent Mode. The level of complexity that the NIC can implement would depend in part on the hardware capabilities of the NIC. Capabilities include processing speed, processing power, memory configuration, I/O support etc. The more advanced the hardware, the more complex protocols/algorithms it can support. In such a scenario, hardware manufacturers have to look at optimal trade-offs, considering parameters like the energy requirements, desired functionality support/minimum functionality support, cost of design/production etc.

In an exemplary implementation, in order to manage power in the proposed NIC architecture, a twin-diode based solution can be incorporated. In an instance, for low voltage drops, Schottky diodes could be used, and to cancel the voltage drop, DC-DC converters could be added. However, for energy efficient solutions, more complex designs using MOSFETs could also be used, all of which possible implementations are well within the scope of the present invention. Alternatively, for instance, dedicated switchover ICs can be incorporated.

Figure 6:
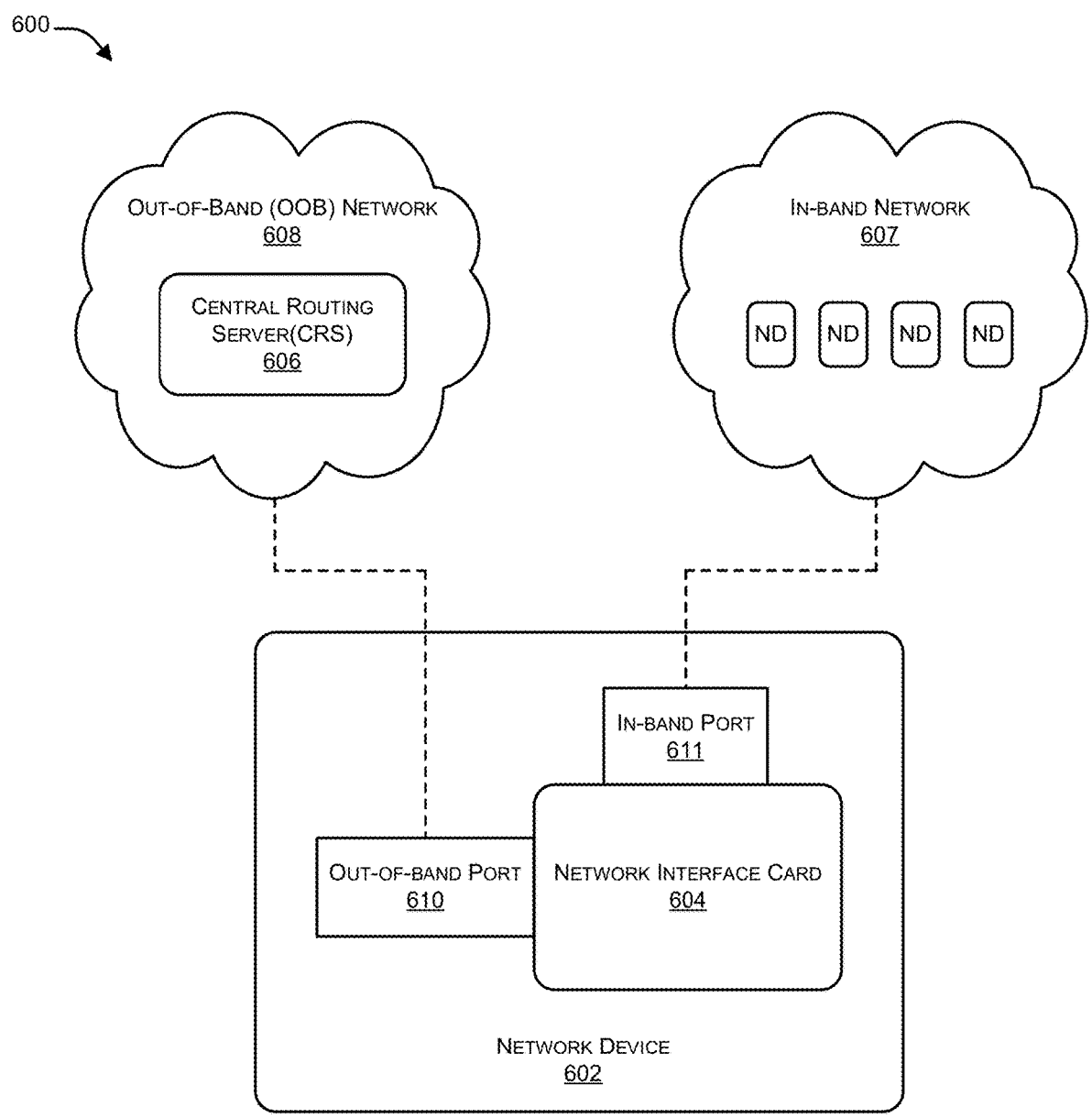
FIG. 6 is an exemplary illustration of a network device using an In-Band Self-Responsive Port for communicating with a neighboring network device in its In-Band Network in accordance with an embodiment of the present disclosure.

With reference to FIG. 6 illustrating an exemplary network device configuration, in an exemplary implementation, the proposed NIC 604 can be configured in one or more network devices (NDs) (such as exemplary ND 602) that form part of a network, wherein the NDs 602 can be connected to and managed by a central routing server (CRS) 606 that may be located in an out-of-band (OOB) network 608 of the NDs it manages. As known, out-of-band data is the data transferred through a stream that is independent from the main in-band data stream. An out-of-band data mechanism provides a conceptually independent channel that allows any data sent via that mechanism to be kept separate from in-band data. The CRS 606 may be connected via a dedicated out-of-band (OOB) interface/port 610 on each ND 602 (for instance, routers and switches that are handling in-band data stream as well), wherein such OOB interface 610 is the proposed network interface as explained above. The CRS 606 can be placed in the same OOB network as the management server, or a separate network. In case of separate network, a separate dedicated port i.e. the proposed network interface can be configured on each ND using which the ND can connect to the novel CRS being described.

In yet another aspect, the CRS can receive messages regarding various network events through the OOB network in which it is configured, wherein the OOB network can in turn be connected to various NDs. For the purpose of this connection, each ND can have a port (OOB port i.e. the proposed network interface of the present invention) that it can use to connect to the network (OOB network) in which the CRS resides. The CRS can have a unique network related identifier (for example, an IP address) on the OOB network, and all NDs can be aware of this address. Further, each ND can have a unique static address (such as a static IP address) that does not change even if the device reboots for any reason on the OOB network and such a static IP address can be assigned to their OOB interface/port. In this manner, the CRS can identify NDs from their static IP addresses. It can be appreciated that the ND can, at the same time, be connected to two networks—an OOB network through its OOB port, and an in-band network as is normally the case for NDs. When a ND needs to send a message to the CRS, it can create a packet with appropriate information in a CRS Message format, and can send this packet through its OOB port to the CRS (that can be part of a server that can be termed CRS server). The CRS can receive the packet and process it appropriately. It can be readily appreciated that since the CRS knows static IP address of all NDs in the OOB network, it can send a message to any of the NDs using their respective static IP address (interchangeably termed as OOB IP address). In this manner, the OOB interface/port 610 can operate in Independent Mode in a CRS based network, when the NIC 604 is based on NIC 100 of FIG. 1.

In an exemplary aspect, network device of the present disclosure can be a Router that includes a network interface card 604 (FIG. 6) wherein 604 is different for OOB Port 610 (604_1) and In-Band Port 611 (604_2). OOB Port 610 of the router that enables connection with the CRS can be based on NIC 100 of FIG. 1 such that during normal operation, the OOB Port 610 functions in Normal Mode and when the router goes down, the OOB Port 610 functions in Independent Mode. In this setup, 604_2 may or may not be based on proposed NIC 100.

In an aspect, network device (ND) can have out-of-band ports, any of which may be used for communicating with the CRS. In an exemplary implementation, all network devices may be required to use the same port to connect to the CRS. The physical medium standard for data communication could be any of the standards supported by the corresponding device(s) these ports connect to. For instance, it could be Ethernet, Wi-Fi, Bluetooth, or any other equivalent. In an exemplary embodiment, out-of-band port P1 can be a regular OOB port for connecting to OOB networks, out-of-band port P2 can be a special OOB port for connecting specifically to the CRS, out-of-band port P3 can be a special type of P1 port that also supports Independent Mode, and similarly out-of-band port P4 can be a special type of P2 port that also supports Independent Mode. ND can also include one or more in-band ports for connecting to other network devices in the in-band network that the ND is residing in. In an aspect, the CRS can likewise have one or more ports to connect to various in-band devices through the OOB ports configured in them. Ports in the CRS can (optionally) support Independent Mode for connections to OOB ports of the in-band NDs.

In an aspect, as mentioned above, in-band network devices can include the proposed Self-Responsive Ports (SRPs) that can work in independent mode as explained above. Firmware on the NIC of the SRP ports can be programmed to support Plug and Play Protocol as mentioned above with respect to CRS functionality. Driver of the NIC can include programs to exchange data with the NIC firmware. The exchange can be based on a protocol defined for communication between the driver and the firmware code. The data may include the MAC address/IP address of the CRS server, and probably the IP address of the CRS Port configured for the network device in the OOB Network. This will allow the NIC to send out messages over IP to the CRS server through the CRS port, when operating in independent mode. The proposed NIC firmware can also be capable of interpreting the Plug and Play message events from the CRS like health checks, which will allow the NIC to respond to those messages even when operating in independent mode.

In an aspect, packet format and fixed data can be loaded in NIC memory by the driver, which can be accessible to the firmware. Fixed data can include data specific to the device like device ID or it's port IDs, or configuration data that doesn't change often, or any data that is not dependent on the current state of the device but required for network change event messages. The variable data can be updated by the main device through the driver as and when the device state changes, which can allow the NIC to send network change events whenever the state changes, without requiring the main system to generate packets for those events. This would also allow the NIC to respond to (some of the) messages received from the CRS (like status requests), without going through the main system when running in normal mode.

Using the CHG_MODE Pin, the proposed NIC enables automatic fail-over to Independent Mode when the main device fails, which can be achieved by connecting the CHG_MODE Pin to an appropriate hardware circuit on the main device, so that it changes its state when main system loses control over the interface. It could also be changed back when the system is ready to regain control, which can allow the NIC to detect such condition(s) and send out appropriate network change event(s) to the CRS. Some of these events can include, but are not limited to, device crash, device reboot, device boot up, device shutdown, device removal, device losing power. When the firmware is appropriately programmed, the NIC can distinguish all of these events based on the sequence of status changes, and thus being capable of sending the relevant event messages, in either of the modes.

In an exemplary aspect, although the Network Device (ND) in a CRS based network, requires only the CRS port (used for connecting to the CRS) to be proposed Self-Responsive Port (SRP), the in-band ports can also benefit from SRP functionality, especially in non-CRS based networks.

Figure 7:
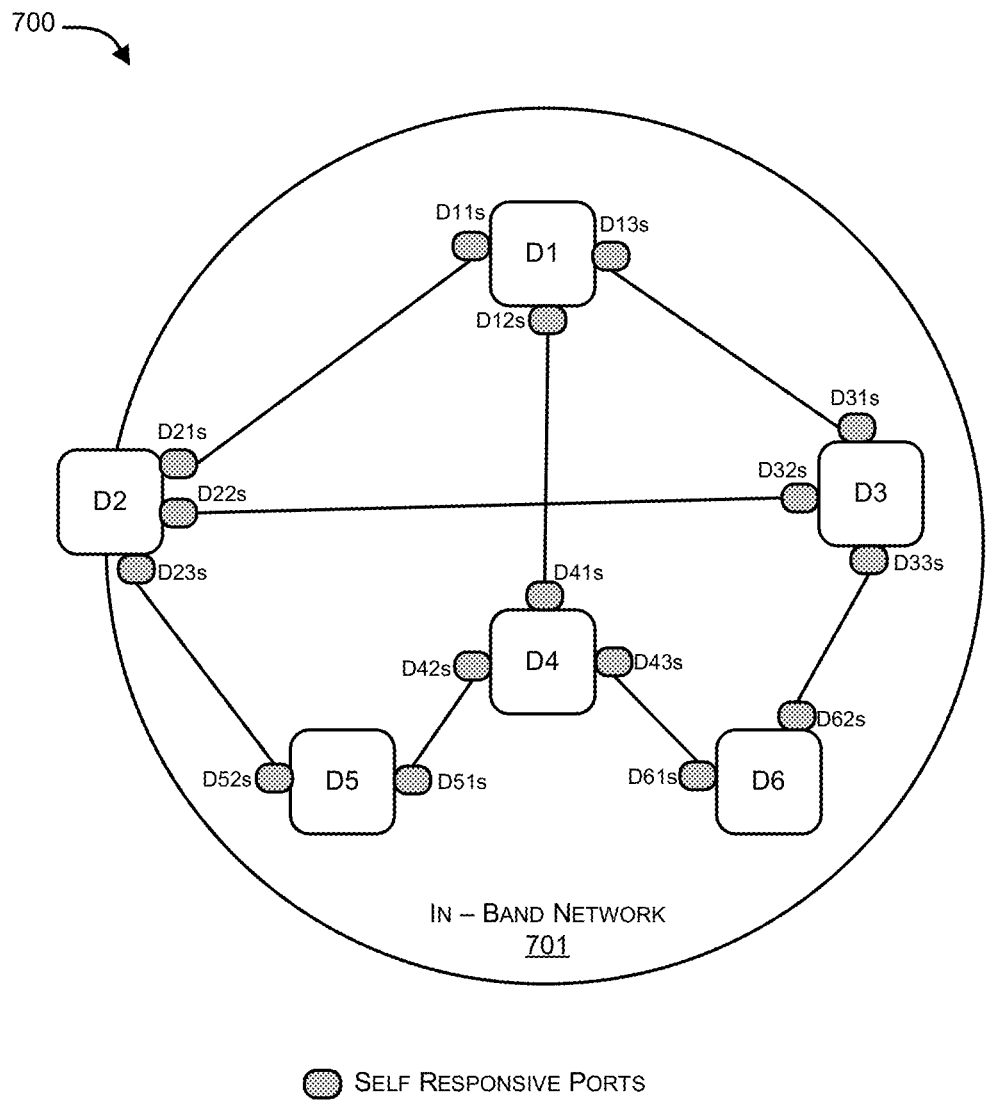
FIG. 7 is an exemplary illustration of an In-Band Network based on Self-Responsive Ports in accordance with an exemplary embodiment of the present disclosure.

With reference to FIG. 7, illustrating an exemplary In-Band Network 701 based on SRP Ports (such ports illustrated by alphanumeric labels ending with 's'), the proposed SRP Ports are used as network ports for all network paths in the In-Band Network 701. Although, it is not mandatory to have all ports as SRP ports in an In-Band Network, the Network benefits most from the SRP Functionality when all ports are Self-Responsive. This enables maximum benefit of the functionalities provided by Self-Responsive Ports for reliable network operation.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

I claim:

1. A Network Interface Card (NIC) operatively coupled with a network device and comprising at least one network interface/port, wherein the network device forms part of a network having a plurality of other network devices, said network or a part thereof being connected to a central routing server (CRS), said NIC comprising:

a processing unit;

a non-volatile memory operatively coupled with the processing unit;

Random Access Memory (RAM);

an interface for communication with said network device;

one or more Mode Pins; and a power input connected to a decoupled power supply, wherein the NIC is configured to:

detect that the network device undergoes a network change event, said network change event being related to change in state of the network device; and transmit a message associated with the network change event to the CRS when the network change event is detected on the network device;

wherein the NIC is configured in a manner that allows the NIC to work in an independent mode by decoupling from main processor of the network device such that the NIC performs one or more programmed operations even when the network device is non-operational or when the network device undergoes the network change event such that when the network device is unavailable to the network, the NIC of said network device works in the independent mode to communicate with the CRS on behalf of the network device without the plurality of neighboring network devices informing the CRS individually about the unavailability of the said network device.

2. The NIC as claimed in claim 1, wherein change of mode of the NIC between normal and independent mode does not affect adjacent network connections, and other network devices of the network do not have to undergo any network change due to the change of the mode of the NIC on the network device, making the NIC mode change transparent to the network.

3. The NIC as claimed in claim 1, wherein, during operation of the NIC in the independent mode, said one or more programmed operations are selected from any or a combination of reporting errors when said network device is non-functional, performing minimum programmed operations even when said network device is non-functional, sending status updates of said network device periodically or in real-time, handling communication with external network devices during software upgrade, detecting software/hardware/firmware failures in said network device, sending programmed messages, performing operations that are programmed to be offloaded from said network device to said NIC, and replying to one or more configured requests from other network devices.

4. The NIC as claimed in claim 1, wherein said network device is any or a combination of a client device, a router, a switch, a hub, a controller, a network security device, a server, and a computing device having networking capabilities.

5. The NIC as claimed in claim 1, wherein said network change event comprises any or a combination of software change in said network device, crash of said network device, network device reboot or boot up, network device shutdown, software debug, power outage/power outage resolution, power failure, and a failure in which the network device becomes non-functional and is unable to directly communicate over its network ports.

6. The NIC as claimed in claim 1, wherein said decoupled power supply is any or a combination of a battery, a secondary power supply, and Power over Ethernet (PoE) based powering.

7. The NIC as claimed in claim 1, wherein said NIC further comprises a Mode Register, wherein the Mode Register is configured to enable/disable the independent mode based on value of said Register.

8. The NIC as claimed in claim 7, wherein said NIC and components thereof are implemented as an System-on-Chip (SoC).

9. The NIC as claimed in claim 7, wherein said one or more Mode Pins comprise a CHG_MODE Pin that is configured as an Input Pin to enable change in Mode of said NIC from Normal to Independent or from Independent to Normal, and a CHK_MODE pin that is configured as an Output Pin to indicate current mode of said NIC.

10. The NIC as claimed in claim 9, wherein when the network change event occurs, the NIC performs any programmed operations in independent mode or normal mode based on the pull of the CHG_MODE Pin and when Independent mode is enabled by the Mode Register.

11. The NIC as claimed in claim 1, wherein said NIC further comprises a RESET Pin to allow a user to reset the NIC to default settings.

12. The NIC as claimed in claim 1, wherein said network or a part thereof being operatively coupled to the CRS through an out-of-band (OOB) network, wherein said network device is connected with said CRS through said at least one network interface/port.

13. The NIC as claimed in claim 12, wherein said network device, using said NIC and its said at least one network interface/port, sends messages to and receives messages from said CRS without interacting with the main processor of the network device.

14. The NIC as claimed in claim 1, wherein the network device, when it is mobile, is capable of relaying its identification (ID) to the nearest cell tower, indicating to the cell tower, its location even when the mobile network device is switched off.

15. A network device comprising a Network Interface Card (NIC) as claimed in claim 1.

* * * * *